United States Patent [19]

Ufermann et al.

[11] 4,068,991

[45] Jan. 17, 1978

[54] LAYER-FORMING APPARATUS ESPECIALLY FOR PARTICLE BOARD MATS

[75] Inventors: Werner Ufermann, Penzberg; Heinrich Axer, Nettetal-Hinsbeck; Wolfgang Michels, Krefeld, all of Germany

[73] Assignee: G. Siempelkamp & Co., Krefeld, Germany

[21] Appl. No.: 711,836

[22] Filed: Aug. 5, 1976

[30] Foreign Application Priority Data

Aug. 8, 1975 Germany ............................. 2535461

[51] Int. Cl.[2] ................................................ B29J 5/00

[52] U.S. Cl. ........................................ 425/81; 425/83; 425/224; 264/113

[58] Field of Search ................. 425/224, 223, 81, 306, 425/82, 83, 294; 264/112, 113

[56] References Cited

U.S. PATENT DOCUMENTS

| | | | |
|---|---|---|---|
| 2,540,092 | 2/1951 | Brassert | 425/294 X |
| 3,038,527 | 6/1962 | Greten | 425/81 X |
| 3,115,431 | 12/1963 | Stokes et al. | 264/113 |
| 3,864,066 | 2/1975 | Gerhardt | 425/224 X |

*Primary Examiner*—Robert L. Spicer, Jr.
*Attorney, Agent, or Firm*—Karl F. Ross

[57] ABSTRACT

A layer-forming apparatus for making particle-board mats comprises a spreading head adapted to deposit particulate matter upon a mat-forming surface. The distributing head comprises an array of mutually parallel interdigitated disk rollers with the interfitting disks defining progressively increasing interstitial spaces as the particles move from one side of the roller array to the other side thereof.

10 Claims, 3 Drawing Figures

LAYER-FORMING APPARATUS ESPECIALLY FOR PARTICLE BOARD MATS

CROSS REFERENCE TO RELATED APPLICATION

The present application is related to the commonly assigned copending application Ser. No. 711,882, filed Aug. 5, 1976.

FIELD OF THE INVENTION

The present invention relates to an apparatus for depositing a layer of particulate material upon a receiving surface and, more particularly, to a layer-forming apparatus for the production of mats adapted to be transformed into particle board.

BACKGROUND OF THE INVENTION

A so-called "particle board" can be formed by compressing a layer of particulate material, generally a mixture of cellulosic or other particles with a binder, in a platen or other press at a temperature sufficient to activate the binder.

Customarily the particles consist predominantly or at least partially, if not entirely, of wood chips, splinters, sawdust and fibers, while the binder may be a thermally activatable synthetic resin which is admixed with the particles or is intrinsically present in the wood. For example, it is known that wood contains abietic resins which can assist in bonding particles of wood together under heat and pressure. In the case of synthetic-resin binders, use is preferably made of phenol-formaldehyde, urea, resorcinol or melamine resin.

When a layer or mat of the particulate material is subjected to heating and compression, the binder is activated (caused to flow and/or set) to bind the particulate material into a coherent sheet or board.

Depending upon the preparations of binder and particulate matter, the nature of the particles and binder, the pressure which is applied and the heating cycle, the boards can be relatively dense, rigid and impermeable to fluid for use as structural members of high strength, can be of moderate density, strength and porosity for use as wall-facing members, or highly porous and very low density for use as insulating boards.

In order to produce such boards, a layer of the particulate material or matter thereof must be applied to a mat-forming surface, which can be the upper surface of a conveyor or a mat-transfer or pressing sheet or plate.

The mat can be produced by metering the quantity of the particulate matter from a hopper and depositing it upon a moving surface which is displaced beneath a distributing head which insures a homogeneous deposition of the particulate material on the surface over the width desired. Such distributing heads are recommended because they prevent localized piling of the particulate material on the surface and serve to distribute the particles substantially uniformly over the width thereof.

It has been proposed (see German published application — OFFENLEGUNGSSCHRIFT — DT-OS 2 229 147) to provide the distributing head with a plurality of so-called disk rollers with the disks of the successive rollers interdigitating. The resulting array has its disks or rollers driven in the same sense so that the particulate material is carried along the top of the array and eventually passes between the disks or rollers through spaces between them or other mat-forming surfaces.

The conventional apparatus has not been used, to our knowledge, for the formation of particle-board mats although the literature does describe a system in which hydraulic binders and fibrous material are deposited in a layer for the production of plastic board. In this case, the disk rollers form part of a wetting device in which the mixture of hydraulic binder and fiber is wetted with water serving as the activator for the hydraulic binder. This system is intended exclusively for the uniform deposition of the mixture upon the receiving surface and there has not been, to our knowledge, any suggestion of the use of this device or any similar device in the fabrication of particle board.

In the production of particle board, moreover, it has been found to be advantageous to provide a surface region with a different porosity or particle characteristic than the body of the board. Such an arrangement has aesthetic reasons as well as structural reasons, the latter deriving from, for example, the lower porosity of a fine-particle zone and the surface of the board. The importance of a facing layer can also be seen from the fact that it has been proposed repeatedly to apply a coherent facing layer, foil or sheet to a particle board by conventional lamination techniques.

Heretofore, when a mat is to be formed with a surface zone of, say, fine particles, it has been necessary to use special means for applying a fine-particle-layer face to the receiving surface and thereafter depositing the rest of the particulate material thereon. Such techniques have proved to be expensive, time-consuming and cumbersome and do not always result in a highly homogeneous or uniformly faced structure.

OBJECTS OF THE INVENTION

It is the principal object of the present invention to provide an improved apparatus for the formation of particle board mats whereby the aforementioned disadvantages are obviated.

It is another object of the invention to provide a device for forming particle board mats with a fine-particle zone for the fabrication of particle board in which this zone constitutes a facing layer integrated into the particle board.

Still another object of the invention is to provide an apparatus capable of classifying and segregating fine particles from coarse particles concurrently with the spreading thereof upon a receiving surface and without requiring preclassification or separation of coarse and fine particles.

SUMMARY OF THE INVENTION

We have now found that the above-mentioned spreading head, which had not previously been considered for the spreading of particulate material in the formation of particle-board mats or mattresses, can be improved for this specific purpose and to obtain a highly effective spreading concurrently with a classification or separation of the particulate material into a fine-particle mass and a coarse-particle mass so as to deposit the separated materials in discrete zones upon the mat-receiving surface.

More specifically, we have found that it is possible to provide the array of interdigitating disk rollers with a progressively increasing spacing from its upstream side to its downstream side so that the portion of the array proximal to the upstream side serves as a fine-particle spreader and the portion of the array proximal to the downstream side serves as a coarse-particle spreader. An intermediate portion of the array can function as a spreader for particulate material of intermediate fineness. Furthermore, by progressively increasing the spacing from the upstream side to the downstream side, it has been found to be possible to provide a continuous particle size gradient between the two zones. The adjustment of the inter-disk spacing permits adjustment of the particle size of the particles which tend to fall through these spaces and hence defines the particle size of the respective zone formed by the head.

While it has been indicated that the zones can merge continuously with one another, i.e. the particle size gradient between the zones can be minimized, it is also possible to maintain a discrete zone for each particle size and insure a precise delineation between the zones.

In general all of the disks of the roller-disk array should have the same diameter, with the progressively increasing spacing being achieved by a reduction from roller to roller of the number of disks and/or by using disks of different thicknesses. With this system, the spreading of the particulate material is accompanied by a classification and a breaking up of clumps, agglomerates or the like so that a homogeneous but zoned mat is produced. The zones should include a facing zone for the mat consisting predominantly of fine particles separated from the coarser particles directly in the head. As described in the aforementioned application, it is possible to operate with completely or partially preclassified particulate material although we prefer to use random masses of particulate material, i.e. particulate material which has not previously been classified or separated as to particle size.

The increase in gap width or spacing size per unit length along the spreading head enables the spreading head to operate first as a fine-particle spreader, then as a spreader for material of intermediate particle size and finally as a coarse-particle spreader. The spacing between the interdigitating disks can be adjusted to the particle size of the respective material by varying the distance between the axes of the disk rollers forming the array. Thus the interdigitating disks of the rollers form spreading columns or shafts for the particulate material of different particle sizes. The transition from one particle size to another can be more or less continuous or even step-wise.

A surprising advantage of the invention is that the particulate material is readily tossed from one roller to the next and passes downwardly in the respective shaft or column where it reaches a roller whose spacing corresponds to the particle size. Heavy splinters, clumps of glue or the like do not pass between the rollers or disks but are eventually carried off to the downstream end of the array where they can be collected in a trough or container and removed. The roller array thus functions as a separating sieve while nevertheless uniformly distributing the particles over the entire width of the mat-forming surface and a substantial length thereof notwithstanding the classification function. Preclassification of the particulate material is not necessary and it is possible to distribute the fine-particle layer on top of the previously formed coarse-particle layer or layers or upon the mat-forming surface so that the coarse-particle layer or layers can be applied to the fine-particle layer.

It is possible to apply fine-particle layers at both the uppermost and lowermost zones when a second apparatus similar to the one described is provided in mirror-symmetrical relationship thereto.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
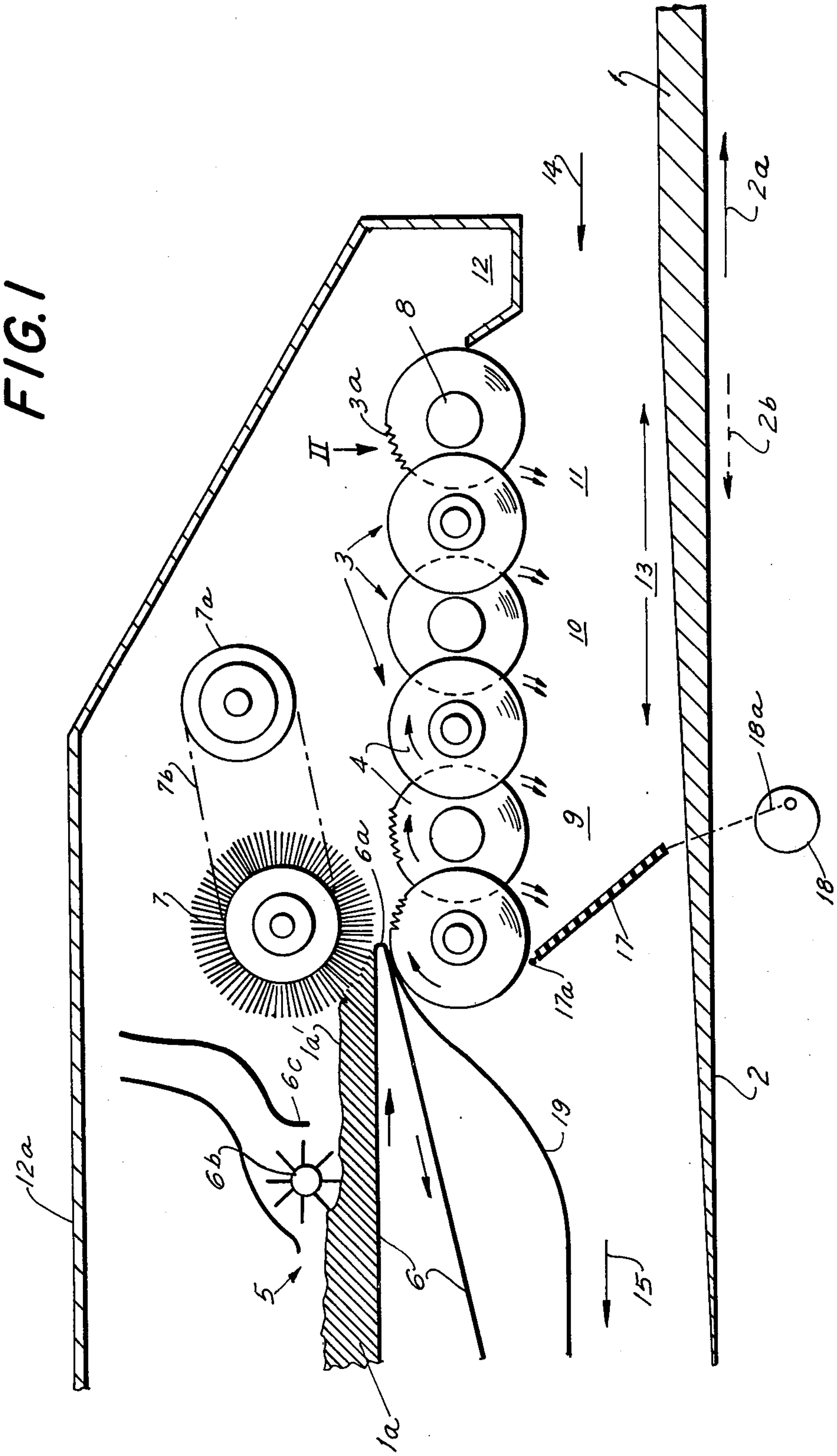
FIG. 1 is a vertical section, partly in diagrammatic form, of a layer-forming apparatus according to the invention.
Figure 2:
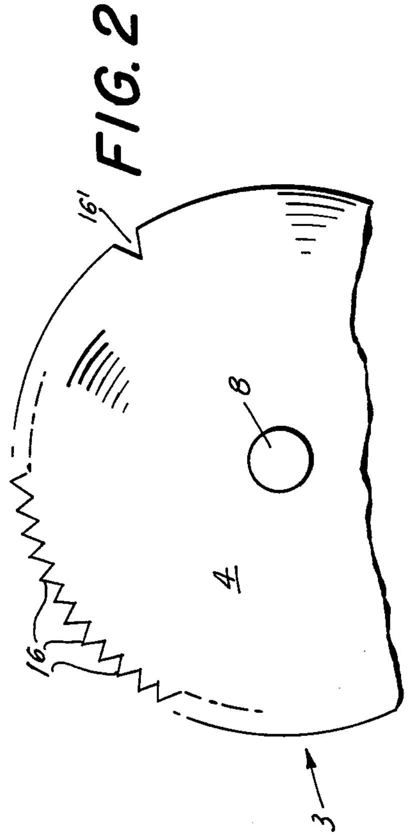
FIG. 2 is an elevational view of a portion of the distributing head as shown at II in FIG. 1 drawn to an enlarged scale.

In FIG. 1 we have shown a spreading device in which a mat 1 is formed upon surface 2, e.g. a conveyor belt adapted to be moved in the direction shown by the arrow *2a* past a spreading head formed by an array of interdigitated disk rollers 3.

The spreading head is provided in a housing which has only partially been illustrated at *12a* but is formed with a trough 12 to collect splinters of wood, chunks of glue and the like which cannot pass through the distributing head.

At a location now shown, the system can include a hopper depositing the particulate material *1a* on a conveyor 6 having a discharge end *6a*. A pin roller *6b* loosens excess particulate matter from the top of the layer *1a* on conveyor 6 while a suction head *6c* withdraws the loosened particulate material so that the layer *1a'* delivered to the discharge end *6a* has a constant thickness. The reference numeral 5 has been used to designate the particle-feeding means which supplies the spreading head.

At the discharge end *6a* of the conveyor 6, a brush or otherwise contoured cast-off roller 7 is rotatable by a motor *7a*, e.g. via a belt *7b*, so that the oncoming particulate material is cast along the upper surface *3a* of the array of rollers 3 making up the spreading head.

Figure 3:
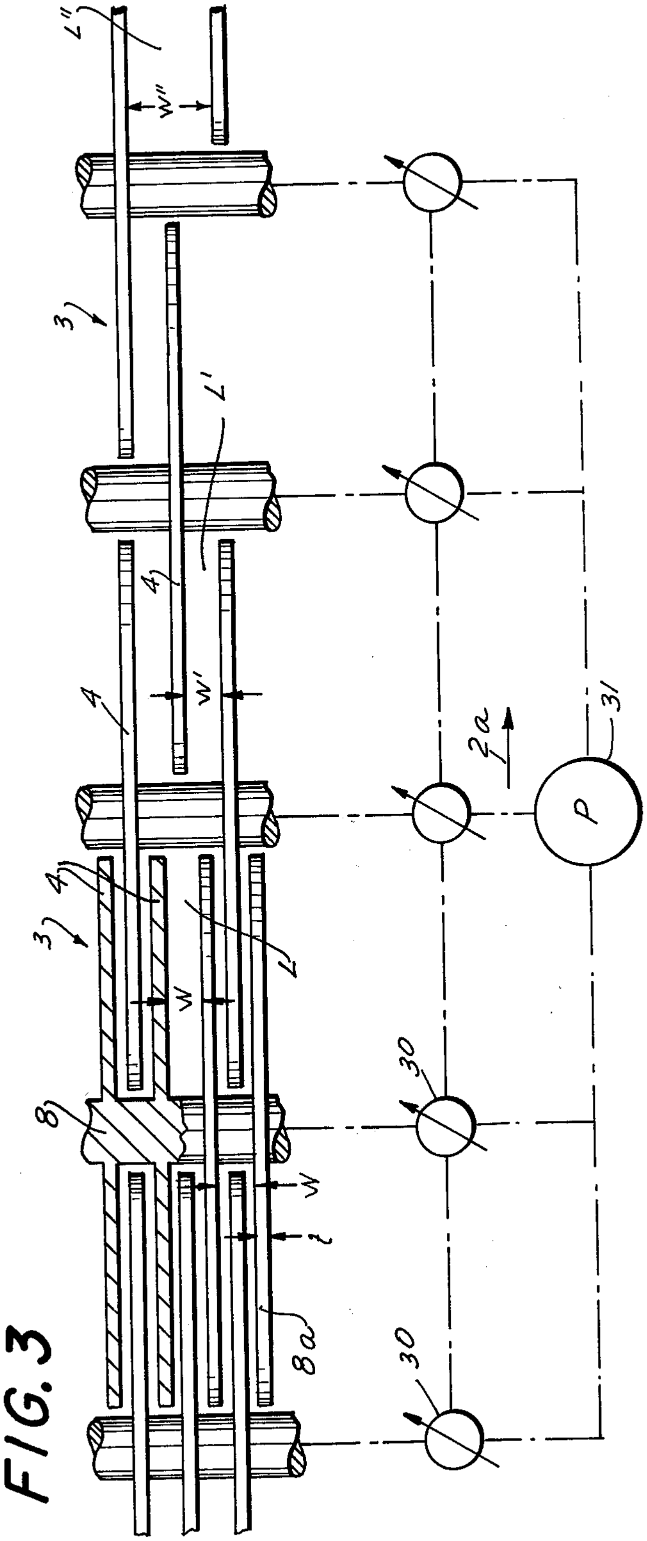
FIG. 3 is a plan view of a portion of the distributing head, partly broken away.

As can be seen from FIG. 3, each of the disk rollers comprises a plurality of disks *8a* whose hubs are joined together to form a drum-like core 8 forming the shaft of the roller. The dists *8a* have thicknesses *t* which are less than the widths *w* of their spacings and are provided in number and size so that gaps L are provided between the disks. In the direction of advance of the particulate material across the top of the array (arrow *2a*) the widths W, W' and W" progressively increase as a function of distance.

All of the disk rollers 3 are driven in the same sense, i.e. the clockwise sense as seen in FIG. 1, so that the particulate material is conveyed from the discharge end *6a* of the conveyor 6, away therefrom.

The gap widths W, W' and W" can be increased by reducing the thickness *t* of each disk, the number of disks or the distance between them.

In the embodiment illustrated, the disk roller 3 proximal to the discharge end *6a* forms with the next disk roller a spreading column 9 which deposits fine particles upon the surface 2, thereby functioning as a fine-material spreader. The next column 10 deposits material of intermediate particle size while the column 11 deposits its materials of coarse particle size.

According to an important feature of the invention, the space 13 between the array of disk rollers 3 and the mat-receiving surface 2 can form an air sifter or flow channel which increases the separation of fine particles from coarse particles and carries the fine particles to the left, i.e. opposite the direction of movement of the surface 2. The classification effect is further improved by providing a separating screen or sieve 17 in the path of the entrained fine particles, this This sieve likewise serving to orient the particles with their longitudinal axes or dimensions in the direction of arrow 2a. Of course, the surface 2 can be displaced in the opposite direction (arrow 2b) so that the fine-particle zone will be deposited upon the coarse-particle zone rather than the reverse which is the case for the embodiment shown in solid lines in FIG. 1.

The disks 4 can be provided with peripheral teeth 16 to facilitate breaking up of the clumps of particulate material and either these teeth or notch-like formations 16' in the disks can be used to displace air through the compartment 13 to provide the air-sifting effect described above. The separating sieve 17 can be vibrated or shaken by a crank drive 18 connected via linkage 18a with the lower part of the sieve 17. The upper part thereof can be connected resiliently at 17a with the housing structure 12a.

It has been found to be advantageous to provide a downwardly extending guide plate 19 to deflect the air-carried particles downwardly onto the surface 2. As can be seen from FIG. 3, moreover, each of the rollers 3 may be driven by a respective variable-speed hydraulic motor 30, the hydraulic motors being energized by a common pump 31. Thus the speeds of the individual rollers 3 can be separately adjusted and the relative amounts of material deposited over the length of the array of rollers can be maintained constant or adjusted to provide the desired particle distribution characteristics.

We claim:

1. An apparatus for forming a particle-board mat, comprising:

- a mat-forming surface displaceable in a given direction;
- a spreading head disposed above said surface, said spreading head comprising an array of mutually parallel interdigitated disk rollers defining between them spaces of a width increasing from an upstream side of said array to a downstream side thereof;
- means for feeding particulate material to said array at said upstream side thereof whereby said particulate material passes downwardly between said rollers in a fine-particle column, an intermediate-particle column and a coarse-particle column, onto said surface;
- means forming an air sifter between said head and said surface for promoting the separation of fine particles and the deposition thereof on said surface as a respective zone of the mat;
- a separating sieve in said air sifter proximal to the upstream side of said array; and means for periodically displacing said sieve.

2. The apparatus defined in claim 1, further comprising means for individually varying the speeds of said rollers.

3. The apparatus defined in claim 1 wherein the disks of said rollers are provided with air-displacing formations to effect an air-sifting of the particles traversing said array.

4. The apparatus defined in claim 3 wherein said formations are teeth on the periphery of the disks of said rollers.

5. The apparatus defined in claim 3 wherein said formations are notches formed in the periphery of the disks of said rollers.

6. The apparatus defined in claim 1 wherein said means for feeding particulate matter to said array includes a conveyor having its discharge end proximal to the upstream side of said array.

7. The apparatus defined in claim 6, further comprising a rotating brush for sweeping particulate material from said conveyor onto said array, said rollers of said array being all driven in the same sense.

8. An apparatus for forming a particle-board mat, comprising:

- a mat-forming surface displaceable in a given direction;
- a spreading head disposed above said surface, said spreading head comprising an array of mutually parallel interdigitated disk rollers defining between them spaces of a width increasing from an upstream side of said array to a downstream side;
- means for feeding particulate material to said array at said upstream side thereof whereby said particulate material passes downwardly between said rollers in a fine-particle column, an intermediate-particle column and a coarse-particle column, onto said surface;
- means forming a flow channel between said head and said surface for promoting the separation of fine particles and the deposition thereof on said surface as a respective zone of the mat;
- a separating sieve in said flow channel proximal to the upstream side of said array; and
- means for periodically displacing said sieve.

9. The apparatus defined in claim 8 wherein said means for feeding particulate matter to said array includes a conveyor having its discharge end proximal to the upstream side of said array.

10. The apparatus defined in claim 9, further comprising a rotating brush for sweeping particulate material from said conveyor onto said array, said rollers of said array being all driven in the same sense.

* * * * *